United States Patent
Oh et al.

(10) Patent No.: US 10,923,283 B2
(45) Date of Patent: Feb. 16, 2021

(54) MULTILAYER CERAMIC ELECTRONIC COMPONENT HAVING AN EXTERNAL ELECTRODE WHICH INCLUDES A GRAPHENE PLATELET

(71) Applicant: SAMSUNG ELECTRO-MECHANICS CO., LTD., Suwon-si (KR)

(72) Inventors: Won Kuen Oh, Suwon-si (KR); Tae Gyeom Lee, Suwon-si (KR); Hang Kyu Cho, Suwon-si (KR); Hye Hun Park, Suwon-si (KR); Han Seong Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 176 days.

(21) Appl. No.: 16/173,254

(22) Filed: Oct. 29, 2018

(65) Prior Publication Data

US 2019/0272955 A1    Sep. 5, 2019

(30) Foreign Application Priority Data

Mar. 2, 2018   (KR) .................. 10-2018-0025068
May 10, 2018   (KR) .................. 10-2018-0053428

(51) Int. Cl.
| | |
|---|---|
| *H01G 4/232* | (2006.01) |
| *H01G 4/30* | (2006.01) |
| *H01B 1/24* | (2006.01) |
| *H01G 4/12* | (2006.01) |
| *H01B 1/22* | (2006.01) |

(52) U.S. Cl.
CPC ............. *H01G 4/2325* (2013.01); *H01B 1/24* (2013.01); *H01G 4/30* (2013.01); *H01B 1/22* (2013.01); *H01G 4/1227* (2013.01)

(58) Field of Classification Search
CPC ............. H01G 4/232; H01G 4/30; H01B 1/24
See application file for complete search history.

(56) References Cited

U.S. PATENT DOCUMENTS

| | | |
|---|---|---|
| 2007/0201183 A1 | 8/2007 | Komatsu et al. |
| 2013/0294006 A1 | 11/2013 | Kang et al. |
| 2015/0068794 A1 | 3/2015 | Kang et al. |

(Continued)

FOREIGN PATENT DOCUMENTS

| | | |
|---|---|---|
| CN | 106479272 A * | 3/2017 |
| JP | H03-91556 A | 4/1991 |

(Continued)

OTHER PUBLICATIONS

Office Action issued in Korean Application No. 10-2018-0053428 dated May 21, 2019, with English translation.

(Continued)

*Primary Examiner* — David M Sinclair
(74) *Attorney, Agent, or Firm* — Morgan, Lewis & Bockius LLP (57) ABSTRACT

A multilayer ceramic electronic component includes a ceramic body including a dielectric and an internal electrode, an electrode layer eletrically connected to the internal electrode, and a conductive resin layer disposed on the electrode layer and including a conductive metal, a graphene platelet, and a base resin.

18 Claims, 5 Drawing Sheets

(56) References Cited

U.S. PATENT DOCUMENTS

| | | | | |
|---|---|---|---|---|
| 2015/0170786 | A1* | 6/2015 | Hong | H01G 2/065 |
| | | | | 174/260 |
| 2015/0171238 | A1* | 6/2015 | Chiu | C22C 32/0089 |
| | | | | 438/98 |
| 2016/0079001 | A1* | 3/2016 | Lin | C04B 35/62685 |
| | | | | 361/305 |
| 2018/0308603 | A1* | 10/2018 | Okano | C08L 63/00 |

FOREIGN PATENT DOCUMENTS

| | | |
|---|---|---|
| JP | 2005-285699 A | 10/2005 |
| JP | 2007-234828 A | 9/2007 |
| JP | 2011-190151 A | 9/2011 |
| KR | 10-2011-0059130 A | 6/2011 |
| KR | 10-2013-0123848 A | 11/2013 |
| KR | 10-2015-0030450 A | 3/2015 |
| KR | 10-2016-0135970 A | 11/2016 |

OTHER PUBLICATIONS

Office Action in corresponding Korean Patent Application No. 10-2020-0017452 dated Oct. 11, 2020, with English Translation.

* cited by examiner

MULTILAYER CERAMIC ELECTRONIC COMPONENT HAVING AN EXTERNAL ELECTRODE WHICH INCLUDES A GRAPHENE PLATELET

CROSS-REFERENCE TO RELATED APPLICATION(S)

This application claims the benefit of priority to Korean Patent Application Nos. 10-2018-0025068 filed on Mar. 2, 2018 and 10-2018-0053428 filed on May 10, 2018 in the Korean Intellectual Property Office, the disclosures of which are incorporated herein by references in their entirety.

BACKGROUND

1. Field

The present disclosure relates to an external electrode paste to implement a multilayer ceramic electronic component having relatively low equivalent series resistance and a multilayer ceramic electronic component to which the external electrode paste is applied.

2. Description of Related Art

Among ceramic electronic components, a multilayer ceramic capacitor includes a plurality of layered dielectric layers, internal electrodes facing each other with the dielectric layer interposed therebetween, and external electrodes electrically connected to the internal electrodes.

Generally, the internal electrodes and external electrodes are manufactured using a paste including a conductive metal powder.

A multilayer ceramic capacitor is widely used as a component of mobile communication devices such as computers, PDAs, cellular phones, and the like, as a multilayer ceramic capacitor is small-sized, secures high capacity, and is easily mounted.

As electronic products have recently been miniaturized and multifunctionalized, a trend for chip components to also be miniaturized and multifunctionalized has emerged. Accordingly, there is demand for small-sized, high capacity multilayer ceramic capacitors.

To implement excellent performance as above, it is necessary to configure resistance of a paste used in internal electrodes and external electrodes to be low.

Also, a multilayer ceramic capacitor has an equivalent series resistance component and an equivalent series inductance component, along with a capacitance component, and the equivalent series resistance component and equivalent series inductance component may inhibit functions of a multilayer ceramic capacitor.

Accordingly, there has been demand for a multilayer ceramic capacitor with relatively low equivalent series resistance.

SUMMARY

An aspect of the present disclosure is to provide an external electrode paste to implement a multilayer ceramic electronic component having relatively low equivalent series resistance and a multilayer ceramic electronic component to which the external electrode paste is applied.

According to an aspect of the present disclosure, a multilayer ceramic electronic component includes a ceramic body including a dielectric and an internal electrode, an electrode layer electrically connected to the internal electrode, and a conductive resin layer disposed on the electrode layer and including a conductive metal, a graphene platelet, and a base resin.

According to another aspect of the present disclosure, a multilayer ceramic electronic component includes a ceramic body including a dielectric layer and an internal electrode, an electrode layer electrically connected to the internal electrode, and a conductive resin layer disposed on the electrode layer and including a conductive metal and a base resin. When a Raman analysis of the conductive resin layer is performed, two peaks are detected.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings can be exaggerated for clear description, and the elements indicated by the same reference numeral are same elements in the drawings.

Figure 1:
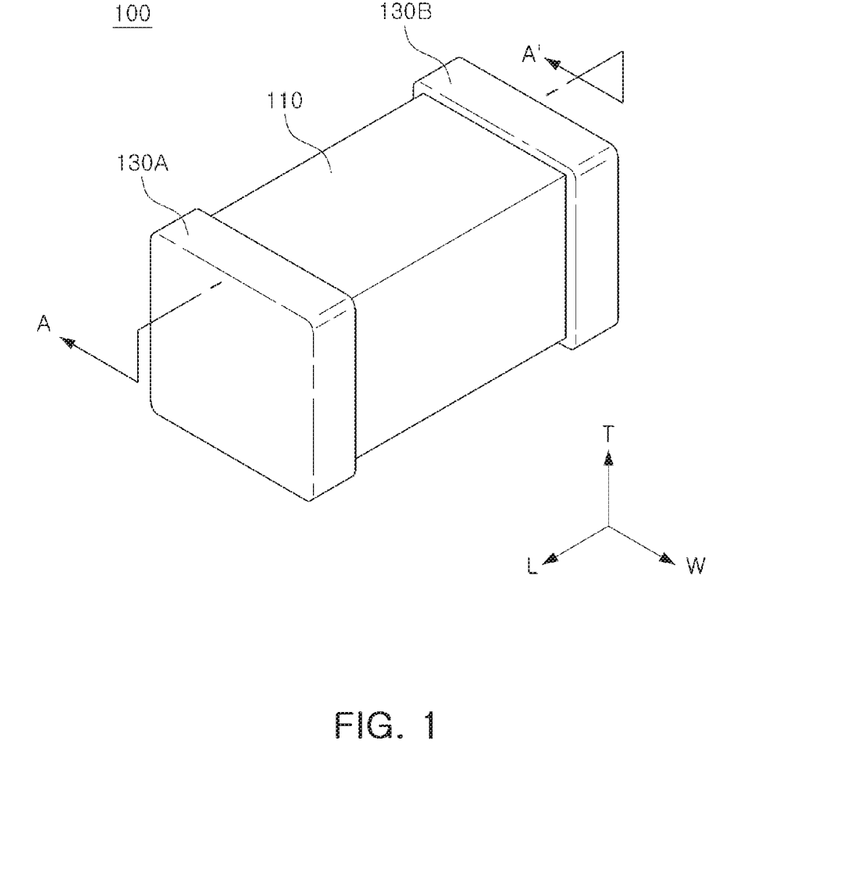
FIG. 1 is a schematic perspective view of a multilayer ceramic capacitor according to an exemplary embodiment in the present disclosure.

FIG. 1 is a schematic perspective view of a multilayer ceramic capacitor according to an exemplary embodiment in the present disclosure.

Figure 2:
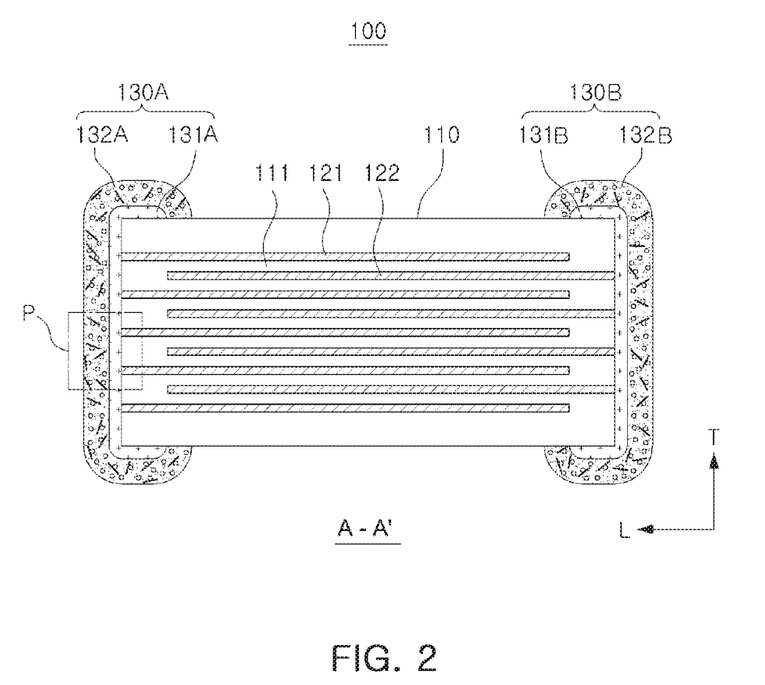
FIG. 2 is a cross-sectional view taken along line A-A' in FIG. 1.

FIG. 2 is a cross-sectional view taken along line A-A' in FIG. 1.

Figure 3:
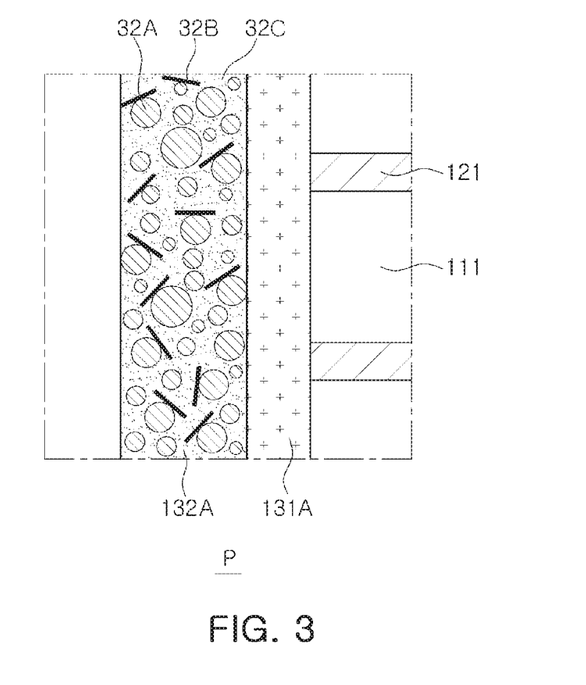
FIG. 3 is a magnified view of area P in FIG. 2.

FIG. 3 is a magnified view of area P in FIG. 2.

Referring to FIGS. 1, 2 and 3, a multilayer ceramic electronic component 100 according to an exemplary embodiment may comprise a ceramic body 110 including a dielectric layer 111 and internal electrodes 121 and 122, electrode layers 131A and 131B connected to the internal electrodes 121 and 122, conductive resin layers 132A and 132B formed on the electrode layers 131A and 131B and including a conductive metal 32A, a graphene platelet 32B and a base resin 32C.

Specifically, the multilayer ceramic electronic component 100 may include the ceramic body 110 including the dielectric layer 111, first and second internal electrodes 121 and 122 configured to face each other with the dielectric layer 111 interposed therebetween in the ceramic body 110, the first electrode layer 131A configured to be electrically connected to the first internal electrode 121 and the second electrode layer 131B configured to be electrically connected to the second internal electrode 122, and the first conductive resin layer 132A formed on the first electrode layer 131A and the second conductive resin layer 132B formed on the second electrode layer 131B. The first conductive resin layer 132A and the second conductive resin layer 132B may include the conductive metal 32A, the graphene platelet 32B, and the base resin 32C.

The first and second conductive resin layers 132A and 132B may be formed by applying an external electrode paste including the conductive metal 32A powder, the graphene platelet 32B and the base resin 32C, and each of the first and second conductive resin layers 132A and 132B may include 5-30 parts by weight of base resin (3), and 0.5-5 parts by weight of graphene platelet (1) based on 100 parts by weight of conductive metal (2) powder.

The first and second conductive resin layers 132A and 132B may be formed by applying an external electrode paste in accordance with the exemplary embodiment, and thus will be described in the description below.

The base resin 32C may be implemented by a material which has adhesive properties and shock absorption properties and is able to form a paste when mixed with the conductive metal 32A, but is not limited thereto. For example, the base resin 32C may include epoxy resin.

In the case in which the content of the base resin 32C is less than 5 parts by weight, it may be difficult to manufacture a paste due to a shortage of resin and a decrease in phase stability, which may lead to phase separation or a change in viscosity, and the dispersibility of metal may also be degraded, which may cause a decrease in a filling rate and a degradation of density. In the case in which the content of base resin 32C exceeds 30 parts by weight, the contact between metals may degrade due to excessive resin content, which may increase resistivity and the resin area of the surface, and accordingly, in the case in which a plating layer is formed after the first and second conductive resin layers 132A and 132B are formed, there may be a problem of platingless defects.

Generally, in the case in which a conductive resin layer is disposed on an external electrode of a multilayer ceramic capacitor, the conductive resin layer may be configured to cover the whole electrode layer connected to an internal electrode, and current may flow through the conductive resin layer for electric conduction with outside.

The conductive resin layer may be formed with a conductive metal for securing electric conductivity and a base resin for shock absorption. In the case in which the conductive resin layer includes a base resin, durability against external stimuli such as bending of a multilayer ceramic electronic component may improve, but resistivity may become high compared to an electrode which does not include a base resin, and accordingly, equivalent series resistance of a multilayer ceramic electronic component may increase.

However, according to an exemplary embodiment, as the first and second conductive resin layers 132A and 132B include the graphene platelet 32B in addition to the conductive metal 32A powder and the base resin 32C, durability against external stimuli such as bending of a multilayer ceramic electronic component may improve, and further, the graphene platelet may address the problem of increase of equivalent series resistance of a multilayer ceramic electronic component caused by the base resin, thereby decreasing equivalent series resistance.

According to an exemplary embodiment, as the first and second conductive resin layers 132A and 132B further include the graphene platelet 32B, conductivity may improve 1,000-100,000 times compared to a conventional external electrode, and equivalent series resistance of a multilayer ceramic capacitor may decrease by 30% compared to the prior art.

Specifically, as the first and second conductive resin layers 132A and 132B includes between 0.5 and 7.5 parts by weight of the graphene platelet 32B based on 100 parts by weight of the conductive metal powder 32A, equivalent series resistance of the multilayer ceramic capacitor according to the exemplary embodiment may be lowered.

In the case in which the content of the graphene platelet 32B is less than 0.5 part by weight, it may be impossible to implement the multilayer ceramic electronic component having relatively low equivalent series resistance, and in the case in which the content exceeds 7.5 parts by weight, the platingless defects or a reduction of adhesive strength may occur when a plating layer is formed on an upper portion of the first and second conductive resin layers 132A and 132B.

In the case in which the content of graphene platelet 32b above is represented as the content to be included in the external electrode paste, it may be within a range from 0.4 wt % to 6.0 wt %. In the case in which the content is less than 0.4 wt %, it may be impossible to implement the multilayer ceramic electronic component with relatively low equivalent series resistance, and in the case in which the content exceeds 6.0 wt %, the platingless defect or a reduction of adhesive strength may occur when a plating layer is formed on an upper portion of the first and second conductive resin layers 132A and 132B.

In the case in which the content of the graphene platelet 32B exceeds 6.0 wt %, the viscosity may increase for the shortage of resin in the first and second conductive resin layers 132A and 132B, and accordingly, when the paste to form a conductive resin layer is coated on the external surface of the body, the corner of the external electrode may become thinner, which may cause a deterioration in moisture resistance properties and the problem of decline in reliability.

The graphene platelet 32B may be included in the first and second conductive resin layers 132A and 132B in a content of 2.5 to 2.9 parts by weight based on 100 parts by weight of the conductive metal powder 32A.

In the case in which the content of the graphene platelet 32B is 2.5 to 2.9 parts by weight based on 100 parts by weight of the conductive metal powder 32A, the conductivity of the external electrode may improve, and the effect of reducing equivalent series resistance of the multilayer ceramic electronic component may further improve.

Referring to FIG. 3, in the conductive resin layers 31B and 32B, the graphene platelet 32B may be dispersed in the base resin 32C and be absorbed on the surface of the conductive metal 32A.

As the graphene platelet 32B may be evenly dispersed in the base resin 32C, and in the conductive resin layers 132A and 132B, the increase of equivalent series resistance of the multilayer ceramic electronic component, caused by the base resin 32C, may be offset.

Specifically, by dispersing the graphene platelet 32B having low resistivity and excellent electric conductivity in the base resin 32C, equivalent series resistance of the multilayer ceramic electronic component may be decreased.

Also, in the conductive resin layers 132A and 132B, the graphene platelet 32B is dispersed in planar form.

As the graphene platelet 32B is dispersed in plate form in the conductive resin layers 132A and 132B, the specific surface area may be large, and the effect of reduction in equivalent series resistance of the multilayer ceramic electronic component may be further improved accordingly.

To address the problem of an increase of equivalent series resistance of a multilayer ceramic electronic component caused by a conductive resin layer included in an external electrode, there has been an attempt to include a carbon nanotube (CNT) in a conductive resin layer.

The carbon nanotube is manufactured to include at least one of a single-walled carbon nanotube and a multi walled carbon nanotube.

However, the carbon nanotube has a columnar shape, the inside of which is filled or hollow, or has a pipe shape in which a passage is formed. Accordingly, in the case in which the content of a carbon nanotube is not higher than a certain level, the effect of a reduction in equivalent series resistance of a multilayer ceramic electronic component may be insufficient.

Also, to help the contacting and tunneling between metals in the conductive resin layers, a dispersion of the external electrode paste may be required.

However, in the case in which the content of a carbon nanotube is too high, to increase the effect of reduction of equivalent series resistance of a multilayer ceramic electronic component, there may be a problem in dispersion of a carbon nanotube in the external electrode paste.

Also, in the case in which the content of a carbon nanotube is too high, there may be a problem of a platingless defect or reduction of adhesive strength may occur when a plating layer is formed on an upper portion of a conductive resin layer.

Also, in the case in which the content of a carbon nanotube is too high, the content of base resin contained in the conductive resin layer may be relatively low, and accordingly, the effect of a reduction in shock absorption by elasticity of a conductive resin layer may not be obtained.

However, according to an exemplary embodiment, by including the planar graphene platelet 32B having a large specific surface area in the first and second conductive resin layers 132A and 132B, the effect of reduction of equivalent series resistance of a multilayer ceramic electronic component may be excellent.

In other words, as the graphene platelet 32B according to an exemplary embodiment may have a planar shape and have a large specific surface area, the effect of reduction of equivalent series resistance of a multilayer ceramic electronic component may be excellent with only small content of the graphene platelet 32B.

Also, as the graphene platelet 32B has electric property with only small content thereof compared to a carbon nanotube, the graphene platelet may be dispersed evenly when external electrode paste is manufactured, and accordingly, reliability may become excellent.

Also, as the first and second conductive resin layers 132A and 132B contain a certain range of content of the graphene platelet 32B, the problem of a platingless defect or a reduction of adhesive strength may not occur when a plating layer is formed on the upper portion.

Also, even in the case in which the first and second conductive resin layers 132A and 132B contain low content of the graphene platelet 32B, the effect of reduction in equivalent series resistance of a multilayer ceramic electronic component may be obtained. Accordingly, the content of base resin may be similar to that of the prior art, and the effect of shock absorption by elasticity of a conductive resin layer may be obtained similarly to the prior art.

The length of a major axis of the graphene platelet 32B may range from 0.2 nm to 10 μm, and the length of minor axis may range from 0.2 nm to 10 μm, but are not limited thereto.

According to an exemplary embodiment, at least one or more of the graphene platelets 32B may be disposed within the area of 1 μm×1 μm in the first and second conductive resin layers 132A and 132B.

The measuring of the graphene platelet 32B may not be limited. For example, the graphene platelet 32B may be measured within the area of 1 μm×1 μm in the first and second conductive resin layers 132A and 132B.

For example, the graphene platelet 32B within the area of 1 μm×1 μm in the first and second conductive resin layers 132A and 132B may be measured by scanning a cross section of the multilayer ceramic capacitor in a length-width direction with a transmission electron microscope (TEM).

Specifically, a 1 μm×1 μm area of the first and second conductive resin layers 132A and 132B may be measured using a transmission electron microscope in the area of the first and second conductive resin layers 132A and 132B extracted from the image of the cross section of a length and width direction (L-T), created by cutting the center of the multilayer ceramic capacitor in the width (W) direction.

Figure 4:
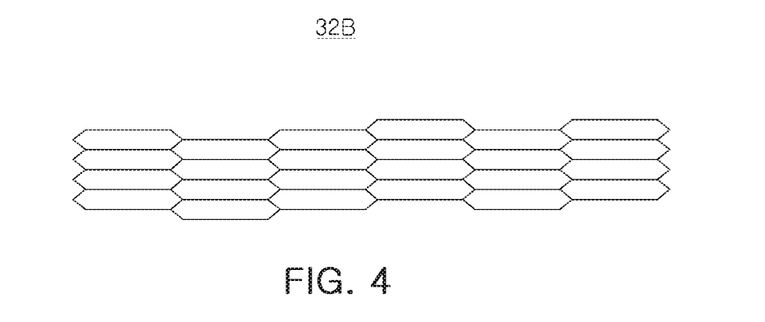
FIG. 4 is a magnified view of a graphene platelet.

FIG. 4 is a magnified view of a graphene platelet in the present disclosure.

Referring to FIG. 4, the graphene platelet 32B may include a plurality of layered planar structures.

As the graphene platelet 32B includes a plurality of layered planar structures, the specific surface area of each of the planar structures may be large, and accordingly, the effect of a reduction of equivalent series resistance may be excellent with only small content of the graphene platelet.

In other words, the graphene platelet 32B having low resistivity and excellent electric conductivity has a planar structure with a large specific surface area, and as the plurality of planar structures are layered, the effect of reduction of equivalent series resistance of a multilayer ceramic electronic component may be excellent.

Also, even in the case in which the first and second conductive resin layers 132A and 132B contain low content of the graphene platelet 32B, the effect of reduction of equivalent series resistance of a multilayer ceramic electronic component may be obtained. Accordingly, the content of base resin may be similar to that of the prior art, and the effect of reduction of shock absorption by elasticity of a conductive resin layer may be obtained similarly to the prior art.

The conductive metal 32A may be one or more material selected from the group consisting of copper (Cu), nickel (Ni), silver (Ag), and silver-palladium (Ag—Pd), but is not limited thereto.

The material forming the dielectric layer 111 may not be particularly limited as long as sufficient capacitance is able to be obtained therewith. For example, the material may be barium titanate ($BaTiO_3$). Also, as the material composing the dielectric layer 111, various ceramic additives, organic solvents, coupling agents, dispersing agents, and the like, may be added in addition to barium titanate ($BaTiO_3$) powder, or the like.

The material composing the first and second internal electrodes 121 and 122 may not be limited. For example, the material may include one or more of silver (Ag), lead (Pb), platinum (Pt), nickel (Ni), and copper (Cu).

The first and second electrode layers 132A and 132B may be directly connected to the first and second internal electrodes 121 and 122 and secure electric conduction between the first and second external electrodes 130A and 130B and the first and second internal electrodes 121 and 122.

The first and second electrode layers 131A and 131B may include conductive metal, and the conductive metal may be nickel (Ni), copper (Cu), palladium (Pd) or gold (Au), or alloy thereof, but is not limited thereto.

The first and second electrode layers 131A and 131B may be sintered electrodes formed by sintering of a paste including conductive metal.

A plating layer (not illustrated) may be formed on the first and second conductive resin layers 132A and 132B. The plating layer may include a nickel-plated layer and a tin-plated layer, and the nickel-plated layer may be disposed on the first and second conductive resin layers 132A and 132B, and the tin-plated layer may be disposed on the nickel-plated layer.

Table 1 below shows the result of evaluation of resistivity after curing a sheet on which a paste is coated, and equivalent series resistance of a multilayer ceramic capacitor in which the resistivity is applied according to an embodiment in which the graphene platelet 32B is included and a comparative example in which the graphene platelet 32B is not included while changing the content of epoxy resin that is the base resin 32C included in the first and second conductive resin layers 132A and 132B of the multilayer ceramic capacitor.

The first and second conductive resin layers 132A and 132B may include 70 wt % to 80 wt % of copper (Cu) as the conductive metal 32A according to the comparative examples and embodiment.

The above comparative example does not include a graphene platelet, and the content of epoxy resin may be 11 wt %.

The embodiment may include 2 wt % of the graphene platelet 32B, and the content of epoxy resin in the embodiments 1, 2, and 3 may be 11 wt %, 13 wt %, and 15 wt %, respectively.

The multilayer ceramic capacitor may be manufactured to have '3216' size (length×width being 3.2 mm×1.6 mm) according to the comparative examples and embodiment, and Table 1 shows the result of an average value and standard deviation of equivalent series resistance of the multilayer ceramic capacitor.

TABLE 1

| | Resistivity of cured sheet ($\Omega$*cm) | Average of equivalent series resistance (m$\Omega$) | Standard deviation of equivalent series resistance |
|---|---|---|---|
| Comparative example | 2.4412E+05 | 8.66 | 2.11 |
| Embodiment 1 | 7.3500E+02 | 5.96 | 0.55 |
| Embodiment 2 | 5.2829E+00 | 5.85 | 0.42 |
| Embodiment 3 | 1.2008E+01 | 6.36 | 0.39 |

Referring to Table 1, the resistivity value after curing of a sheet coated with an external electrode epoxy paste, the sheet being manufactured on the basis of embodiments 1, 2, and 3 that include the graphene platelet 32B, turned out to be lower than the resistivity value in the comparative examples of the prior art which does not include a graphene platelet.

Also, referring to Table 1, in the case of embodiments 1, 2, and 3 including the graphene platelet 32B, the equivalent series resistance value of a multilayer ceramic capacitor reduced by 30% compared to the prior art which does not include a graphene platelet.

Further, in the case of embodiments 1, 2, and 3 including the graphene platelet 32B, the standard deviation of equivalent series resistance value of a multilayer ceramic capacitor is lower than that of the prior art which does not include a graphene platelet, and accordingly, a multilayer ceramic capacitor having more even electric properties may be implemented.

The multilayer ceramic electrical component may be manufactured as below according to an exemplary embodiment.

The dielectric layer 111 may be formed of a plurality of ceramic green sheets formed by coating a carrier film with slurry including a powder of a material such as barium titanate ($BaTiO_3$), or the like, and drying.

The ceramic green sheet may be manufactured by a slurry formed by mixing ceramic powder, binder, and solvent, and manufacturing the slurry as a form of sheet having a thickness of a certain μm by a doctor blade method.

Then, a conductive paste for an internal electrode including nickel powder may be manufactured.

The ceramic body 110 may be manufactured by, after forming an internal layer by coating the green sheet with the conductive paste for internal electrode by a screen printing process, layering the green sheets on which an internal electrode is printed in multiple layers and layering the green sheets on which an internal electrode is not printed on upper and lower surfaces of the laminate in multiple layers, and being sintered.

The internal electrode may be formed as the first and second internal electrodes.

The first and second electrode layers 131A and 131B may be formed on the external surface of the ceramic body to be connected to the first and second internal electrodes, respectively. The first and second electrode layers may be formed by sintering of the paste including a conductive metal and glass.

A type of the conductive metal may not be limited. For example, the conductive metal may be one or more material selected from the group consisting of copper (Cu), silver (Ag), and nickel (Ni), and alloy thereof, and it may be appropriate to include copper (Cu).

The type of glass may also not be limited, and a material having the same component as that of glass used in manufacturing of an external electrode of a general multilayer ceramic capacitor may be used.

The first and second conductive resin layers 132A and 132B may be formed by coating the external surface of the first and second electrode layers 131A and 131B with conductive resin composition including copper. The conductive resin component may include the conductive metal 32A powder including copper and the base resin 32C, and the base resin may be epoxy resin that is a thermosetting resin.

According to an exemplary embodiment, the first and second conductive resin layers 132A and 132B may include 0.5 to 7.5 parts by weight of the graphene platelet 32B based on 100 parts by weight of the conductive metal 32A powder.

As the first and second conductive resin layers 132A and 132B include 0.5 to 7.5 parts by weight of the graphene platelet 32B based on 100 parts by weight of the conductive metal 32A powder, equivalent series resistance of the multilayer ceramic capacitor according to the exemplary embodiment may be lowered.

Preferably, 2.5 to 2.9 parts by weight of the graphene platelet 32B may be included in the first and second conductive resin layers 132A and 132B based on 100 parts by weight of the conductive metal 32A powder.

In the case in which the content of the graphene platelet 32B is 2.5 to 2.9 parts by weight based on 100 parts by weight of the conductive metal 32A powder, conductivity of an external electrode may improve, and the effect of reduction of equivalent series resistance of the multilayer ceramic electronic component may become more excellent.

The method may further include forming a nickel plated layer and a tin plated layer after forming the first and second conductive resin layers 132A and 132B.

Figure 5:
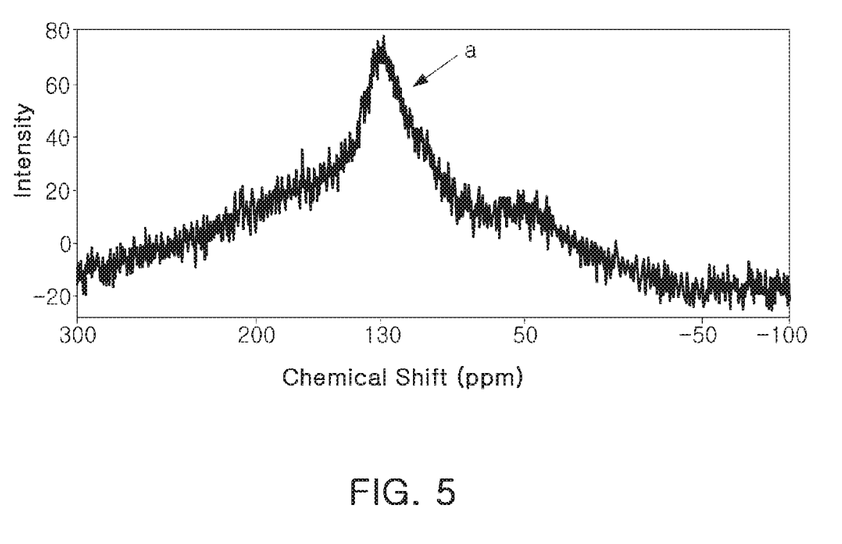
FIG. 5 is a graph illustrating a result of nuclear magnetic resonance (NMR) analysis of an external electrode paste including a graphene platelet according to an exemplary embodiment.

FIG. 5 is a graph illustrating a result of nuclear magnetic resonance (NMR) analysis of an external electrode paste including a graphene platelet according to an exemplary embodiment.

Referring to FIG. 5, in the case in which a nuclear magnetic resonance (NMR) analysis of an external electrode paste including a graphene platelet may be carried out according to the exemplary embodiment, a peak (a) by $sp^2$ carbon may be detected.

The peak (a) by $sp^2$ carbon may also be detected in the analysis of an external electrode of a multilayer ceramic capacitor in which the external electrode paste including a graphene platelet is applied according to the exemplary embodiment.

Figure 6:
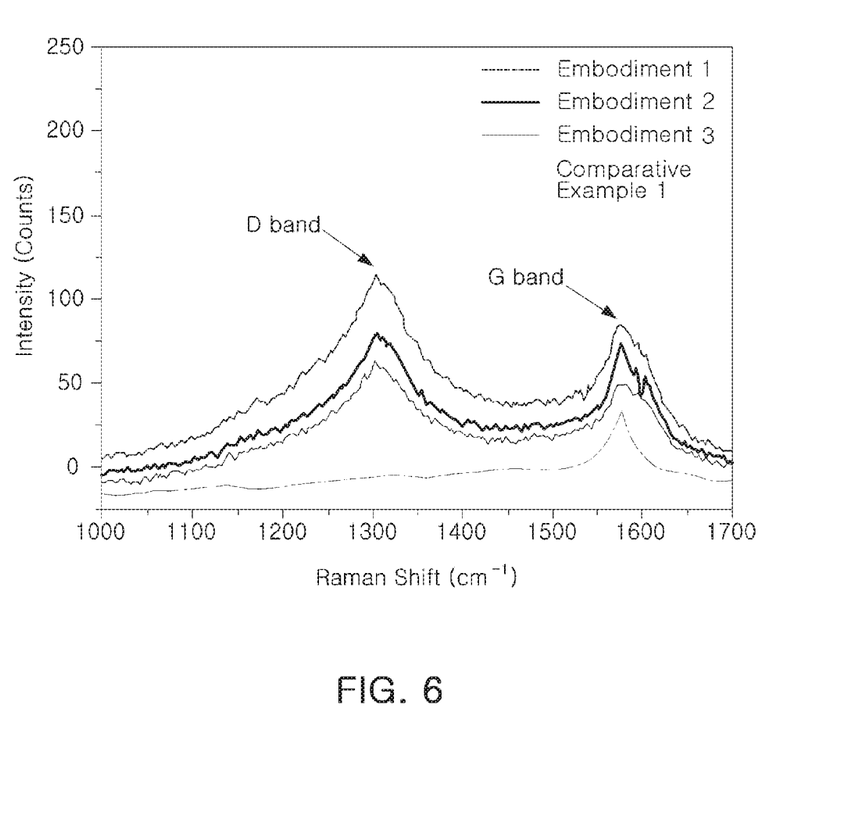
FIG. 6 is a graph illustrating a result of Raman analysis of a conductive resin layer including a graphene platelet according to an exemplary embodiment.

FIG. 6 is a graph illustrating a Raman analysis result of a conductive resin layer including a graphene platelet according to an exemplary embodiment.

Referring to FIG. 6, the multilayer ceramic electronic component 100 according to another exemplary embodiment may include the ceramic body 110 including the dielectric layer 111 and the internal electrodes 121 and 122, the electrode layers 131A and 131B connected to the internal electrodes 121 and 122, and the conductive resin layers 132A and 132B formed on the electrode layers 131A and 131B and including a conductive metal and a base resin, and when a Raman analysis is performed to the conductive resin layers 132A and 132B, two peaks may be detected.

As illustrated in the Raman analysis graph in FIG. 6, embodiments 1, 2, and 3 may be samples of exemplary embodiment, and two peaks may be detected. Comparative example 1 may be a graph of a Raman analysis of graphite, and only one peak may be detected.

According to another exemplary embodiment, the two peaks may be detected in a D band and a G band.

Also, in comparative example 1, only one peak may be detected in the G band.

According to another exemplary embodiment, the conductive resin layers 132A and 132B may include a graphene platelet.

When a Raman analysis of the conductive resin layers 132A and 132B are carried out, the two peaks may be detected because the conductive resin layers 132A and 132B include a graphene platelet. A Raman analysis graph of other carbon material may appear differently.

According to an aspect of the present disclosure, a multilayer ceramic electronic component having relatively low equivalent series resistance may be implemented by including a graphene platelet having low resistance in the external electrode paste.

While the exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including a dielectric layer and an internal electrode;
an electrode layer electrically connected to the internal electrode; and
a conductive resin layer disposed on the electrode layer and including a conductive metal powder, a graphene platelet, and a base resin,
wherein the graphene platelet has a planar shape.

2. The multilayer ceramic electronic component of claim 1, wherein the graphene platelet includes a plurality of layered planar structures.

3. The multilayer ceramic electronic component of claim 1, wherein a length of the graphene platelet along a major axis is within a range from 0.2 nm to 10 μm.

4. The multilayer ceramic electronic component of claim 1, wherein a length of the graphene platelet along a minor axis is within a range from 0.2 nm to 10 μm.

5. The multilayer ceramic electronic component of claim 1, wherein the conductive resin layer is formed of a paste including the graphene platelet and the conductive metal powder, and a content of the graphene platelet in the paste is within a range from 0.5 to 7.5 parts by weight, based on 100 parts by weight of the conductive metal powder.

6. The multilayer ceramic electronic component of claim 1, wherein the conductive resin layer includes a plurality of the graphene platelets, and, in a cross section in a length and width direction, at least one of the graphene platelets is disposed within an area of 1 μm×1 μm in the conductive resin layer.

7. The multilayer ceramic electronic component of claim 1, wherein the conductive resin layer includes a plurality of the graphene platelets which are evenly dispersed in the conductive resin layer.

8. A multilayer ceramic electronic component comprising:
a ceramic body including a dielectric layer and an internal electrode;
an electrode layer electrically connected to the internal electrode; and
a conductive resin layer disposed on the electrode layer and including a conductive metal powder, a graphene platelet, and a base resin,
wherein two peaks are detected when a Raman analysis of the conductive resin layer is performed, and
wherein the graphene platelet has a planar shape.

9. The multilayer ceramic electronic component of claim 8, wherein a first peak of the two peaks is detected in a D band, and a second peak of the two peaks is detected in a G band.

10. The multilayer ceramic electronic component of claim 8, wherein the graphene platelet includes a plurality of layered planar structures.

11. The multilayer ceramic electronic component of claim 8, wherein a length of the graphene platelet along a major axis is within a range from 0.2 nm to 10 μm.

12. The multilayer ceramic electronic component of claim 8, wherein a length of the graphene platelet along a minor axis is within a range from 0.2 nm to 10 μm.

13. The multilayer ceramic electronic component of claim 8, wherein the conductive resin layer is formed of a paste including the graphene platelet and the conductive metal powder, and a content of the graphene platelet in the paste is within a range from 0.5 to 7.5 parts by weight, based on 100 parts by weight of the conductive metal powder.

14. The multilayer ceramic electronic component of claim 8, wherein the conductive resin layer includes a plurality of the graphene platelets and a density of the plurality of the graphene platelets in the conductive resin layer is greater than or equal to one graphene platelet per cubic μm of the conductive resin layer.

15. The multilayer ceramic electronic component of claim 8, wherein the conductive resin layer includes a plurality of the graphene platelets which are evenly dispersed in the conductive resin layer.

16. A conductive resin including a base resin, a conductive metal powder and a plurality of graphene platelets having a planar shape,
wherein the conductive resin is formed of a paste for an external electrode, and
a content of the plurality of graphene platelets in the paste is within a range from 0.5 to 7.5 parts by weight, based on 100 parts by weight of the conductive metal powder.

17. The conductive resin of claim 16, wherein a content of the base resin in the paste is within a range from 5 to 30 parts by weight, based on 100 parts by weight of the conductive metal powder.

18. The conductive resin of claim 16, wherein the graphene platelets are evenly dispersed in the conductive resin.

* * * * *